US010997153B2

(12) United States Patent
Watkins et al.

(10) Patent No.: US 10,997,153 B2
(45) Date of Patent: May 4, 2021

(54) TRANSACTION ENCODING AND TRANSACTION PERSISTENCE ACCORDING TO TYPE OF PERSISTENT STORAGE

(71) Applicant: HEWLETT PACKARD ENTERPRISE DEVELOPMENT LP, Houston, TX (US)

(72) Inventors: Glenn S. Watkins, Northborough, MA (US); John Michael Czerkowicz, Wakefield, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 15/958,754

(22) Filed: Apr. 20, 2018

(65) Prior Publication Data
US 2019/0325048 A1 Oct. 24, 2019

(51) Int. Cl.
*G06F 17/00* (2019.01)
*G06F 16/23* (2019.01)
*G06F 16/901* (2019.01)

(52) U.S. Cl.
CPC ...... *G06F 16/2365* (2019.01); *G06F 16/2358* (2019.01); *G06F 16/9024* (2019.01)

(58) Field of Classification Search
CPC ............. G06F 16/2365; G06F 16/9024; G06F 16/2358; G06F 16/9027; G06F 16/27
See application file for complete search history.

(56) References Cited

U.S. PATENT DOCUMENTS

| 5,506,983 A * | 4/1996 | Atkinson ............ G06F 3/0605 707/703 |
| 6,016,495 A | 1/2000 | McKeehan et al. |
| 6,115,705 A | 9/2000 | Larson |
| 6,493,826 B1 | 12/2002 | Schofield et al. |
| 6,970,970 B2 * | 11/2005 | Jung .................... G06Q 20/341 707/999.202 |
| 7,103,595 B2 | 9/2006 | Anastasiadis et al. |
| 7,139,781 B2 | 11/2006 | Young et al. |
| 7,454,592 B1 | 11/2008 | Shah et al. |
| 7,747,663 B2 | 6/2010 | Atkin et al. |
| 7,814,078 B1 | 10/2010 | Forman et al. |
| 8,028,106 B2 | 9/2011 | Bondurant et al. |

(Continued)

FOREIGN PATENT DOCUMENTS

| WO | WO-2016122710 A1 | 8/2016 |
| WO | 2017/180144 A1 | 10/2017 |

OTHER PUBLICATIONS

Microsoft Computer Dictionary, 5th Ed., 2002, 7 pages.

(Continued)

*Primary Examiner* — Greta L Robinson
(74) *Attorney, Agent, or Firm* — Jaffery Watson Mendonsa & Hamilton

(57) ABSTRACT

In example implementations, a system may receive an input/output (I/O) operation in an object store storing a first object, determine objects represented in the object store affected by storing the first object, transcode the I/O operation into a transaction including the linked list of updates to objects represented in the object store, determine a persistent storage for storing the transaction and persist the transaction to the persistent storage according to a data structure determined by the type of persistent storage.

22 Claims, 7 Drawing Sheets

(56) References Cited

U.S. PATENT DOCUMENTS

| | | | |
|---|---|---|---|
| 8,140,625 | B2 | 3/2012 | Dubnicki et al. |
| 8,140,786 | B2 | 3/2012 | Bunte et al. |
| 8,239,356 | B2 | 8/2012 | Giampaolo et al. |
| 8,478,799 | B2 | 7/2013 | Beaverson et al. |
| 2004/0148306 | A1 | 7/2004 | Moulton et al. |
| 2006/0036898 | A1 | 2/2006 | Doering |
| 2009/0013122 | A1 | 1/2009 | Sepe et al. |
| 2011/0145207 | A1 | 6/2011 | Agrawal et al. |
| 2011/0307447 | A1 | 12/2011 | Sabaa et al. |
| 2013/0013874 | A1* | 1/2013 | Graefe ............... G06F 11/1469 711/162 |
| 2015/0019792 | A1 | 1/2015 | Swanson et al. |
| 2015/0142733 | A1* | 5/2015 | Shadmon ............... G06F 16/21 707/609 |
| 2016/0378818 | A1* | 12/2016 | Marcotte ............ G06F 16/2379 707/703 |
| 2017/0124128 | A1 | 5/2017 | Oks et al. |
| 2017/0139976 | A1 | 5/2017 | Aggarwal et al. |
| 2017/0177644 | A1 | 6/2017 | Golander et al. |
| 2017/0199891 | A1 | 7/2017 | Aronovich et al. |
| 2018/0218023 | A1* | 8/2018 | Fanghaenel ......... G06F 16/2343 |
| 2018/0322062 | A1 | 11/2018 | Watkins et al. |

OTHER PUBLICATIONS

Mesnier et al., "Object-Based Storage", IEEE Communications Magazine, vol. 41, Aug. 2003, pp. 84-90.

Mendel Rosenblum, "The Design and Implementation of a Log Logstructuredfile System", Kluwer Academic Publishers, 1995, 3 pages.

Martin Placek, "Storage Exchange: A Global Platform for Trading Distributed Storage Services," Master of Engineering Science Thesis, The University of Melbourne, Australia, Jul. 2006, 185 pages.

Marice J. Bach, The Design of the UNIX Operating System (1986), 8 pages.

Li, et al., "Secure Untrusted Data Repository (SUNDR)", USENIX Association OSDI '04: 6th Symposium on Operating Systems Design and Implementation, Dec. 6-8, 2004, pp. 121-136, (Springpath Exhibits 1003 & 1103).

Levanoni et al., "An On-the-Fly Reference-Counting Garbage Collector for Java", ACM Transactions on Programming Languages and Systems (TOPLAS), vol. 28, 2006, 67 pages.

Kawaguchi et al., "A Flash-Memory Based File System", Proceeding TCON'95 Proceedings of the USENIX 1995 Technical Conference Proceedings, 1995, 10 pages.

Josh Cates, "Robust and Efficient Data Management for a Distributed Hash Table", Jun. 2003, 64 pages.

Joint Claim Construction and Prehearing Statement, Case 4:15-cv-13345-TSH, Document 136, Aug. 7, 2017, pp. 1-8.

Ingrid Hsieh-Yee, "Declaration of Ingrid Hsieh-Yee, PhD, Under 37 C.F.R .sctn. 1.68 in Support of Petition for Inter Partes Review of U.S. Pat. No. 8,478,799", dated Aug. 10, 2017, 77 pages.

IEEE The Open Group, "1003.1 (Trademark) Standard for Information Technology—Portable Operating System Interface (POSIX (R))", Base Specification, Issue 6, IEEE Std 1003.1-2001, Approved Sep. 12, 2001, The Open Group, (Springpath Exhibits 1015 & 1115), 8 pages.

IBM, AIX 5L Version 5.2, "General Programming Concepts: Writing and Debugging Programs", 9th Edition, Aug. 2004, 616 pages.

Hutchinson et al., "Logical vs. Physical File System Backup", Proceedings of the 3rd Symposium on Operating Systems Design and Implementation, New Orleans, Louisiana, Feb. 1999, 12 pages.

Hitz et al., "File System Design for an NFS File Server Appliance", Technical Report 3002, USENIX Winter 1994—San Francisco, California, Jan. 19, 1994, 23 pages.

Hewlett Packard Enterprise Company's Response to Springpath's Supplemental Claim Construction Brief, C.A. No. 4:15-cv-13345-TSH, Oct. 30, 2017, pp. 1-5.

Harel Paz, "Efficient Memory Management for Servers", Research Thesis Submitted to the Senate of the Technion—Israel Institute of Technology, Aug. 2006, 228 pages.

Grembowski et al., "Comparative Analysis of the Hardware Implementations of Hash Functions SHA-1 and SHA-512", Information Security. ISC 2002, Lecture Notes in Computer Science, vol. 2433, 2002, 15 pages.

Garth Gibson, et al., "A Cost-Effective, High-Bandwidth Storage Architecture," Proceedings of the 8th Conference on Architectural Support for Programming Languages and Operating Systems, 1998, pp. 92-103.

Fu et al., Fast and Secure Distributed Read-Only File System, ACM Transactions on Computer Systems, vol. 20, No. 1, Feb. 2002, pp. 1-24.

Fu et al., "Fast and Secure Distributed Read-Only File System", Proceeding OSDI'00 Proceedings of the 4th conference on Symposium on Operating System Design & Implementation, vol. 4, 2000, 16 pages.

Frequently Asked Questions for FreeBSD 2.X, 3.X and 4.X-, unknown date, 8 pages,. ,Achived at https://web.archive.org/web/20020404064240/http://www.freebsd.org:80/doc/en_US.ISO8859-1/books/faq/install.html.

Frank Dabek, "A Distributed Flash Table," Sep. 2005, pp. 1-135, Massachusetts Institute of Technology.

Defendant Springpath, Inc.'s Repiy Claim Construction Brief, Case 4:15-cv-13345-TSH, Document 133, Jul. 24, 2017, pp. 1-17.

Defendant Springpath, Inc.'s Motion for Leave to File Supplemental Claim Construction Brief, Case 4:15-cv-13345-TSH, Document 146, Oct. 17, 2017, pp. 1-5.

Declaration of Darrell D.E.Long, Ph.D. Regarding U.S. Pat. No. 8,478,799 dated Sep. 14, 2016, Case IPR2016-01780 (Springpalh Exhibit 1102), 114 pages.

Declaration of Darrell D.E.Long, Ph.D. Regarding U.S. Pat. No. 8,478,799 dated Sep. 14, 2016, Case IPR2016-01779 (Springpath Exhibit 1002), 109 pages.

Decision Denying Institution of Inter Partes Review, Case IPR2017-01933, U.S. Pat. No. 8,478,799 B2, Mar. 16, 2018, pp. 1-18, USPTO.

David Bader, "Declaration of David Bader, Under 37 C.F.R. .sctn. 1.68", dated Aug. 10, 2017, 31 pages.

Dabek et al., "Wide-area cooperative storage with CFS," Operating Systems Review—Proceedings of the 18th ACM Symposium on Operating Systems Principles (SOSP'01), vol. 35, No. 5, 2001, pp. 202-215.

Cox et al., "Pastiche: Making Backup Cheap and Easy", ACM SIGOPS Operating Systems Review—OSDI '02: Proceedings of the 5th Symposium on Operating Systems Design and Implementation, vol. 36, 2002, 14 pages.

Chaves et al., "Cost-Efficient SHA Hardware Accelerators", IEEE Transactions on Very Large Scale Integration (VLSI) Systems, vol. 16, No. 8, Aug. 2008, pp. 999-1008.

Byung-Gon Chun, et al., "Efficient Replica Maintenance for Distributed Storage Systems," USENIX Association, Proceedings of NSDI '06: 3rd Symposium on Networked Systems Design & Implementation, 2006, pp. 45-58.

Bruce Schneier, "Applied Cryptography, 2d Ed, Protocol, Algorithms, and Source Code in C", John Wiley & Sons, Inc., 1996, 4 pages.

Bruce Eckel, "C++ Inside & Out", 1992, 6 pages.

Boehm et al., "Garbage Collection in an Uncooperative Environment", Software—Practice & Experience, vol. 18, Sep. 1988, 17 pages.

Bobbarjung et al., "Improving Duplicate Elimination in Storage Systems", ACM Transactions on Storage, vol. 2, 2006, 23 pages.

Bibliographic Record Information for Operating Systems Review—Proceedings of the 18th ACM Symposium on Operating Systems Principles (SOSP'01), 2001, available at the online catalog of the Library of Congress, accessed Jul. 31, 2017, 3 pages.

Best, et al., "How the Journaled File System handles the on-disk layout", May 2000, IBM: developerWorks: Linux library/Open source library Internet download Apr. 18, 2001; http://swgiwas001.sby.ibm.com/developerworks/library/jfslayoul/Index1.html (Springpath Exhibits 1011 & 1111), 30 pages.

(56) References Cited

OTHER PUBLICATIONS

Andrew S. Tanenbaum, "Modern Operating Systems", 2d Ed., 2001, 7 pages.
AMD Athlon (Trademark), "Processor Quick Reference FAQ", Feb. 3, 2000, 12 pages.
Alan Freedman, "Computer Desktop Encyclopedia", 9th Ed., Osborne/McGraw-Hill, 2001, 7 pages.
AIX 5L Version 5.2 System Management Concepts: Operating System and Devices, May 2004, 7th ed., IBM, pp. 1-190.
Abd-El-Malek et al, Ursa Minor: Versatile Cluster-Based Storage, Proceeding FAST'05 Proceedings of the 4th conference on USENIX Conference on File and Storage Technologies, vol. 4, 2005, 14 pages.
"Curriculum Vitae of Dr. Prashant Shenoy", 2017, 31 pages.
"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.
"AMD Athlon Processor", ADM Technical Brief, Publication # 22054, Rev. D, Issue date Dec. 1999, 10 pages.
Haris Volos et al., "Mnemosyne: Lightweight Persistent Memory", ASPLOS '11, Mar. 5-11, 2011, pp. 1-13, ACM, Newport Beach, California, USA. https://pdfs.semanticscholar.org/b330/1d90e1c7e1dc4e0fdac9352df109cbfdc2ce.pdf.
Youyou Lu et al., "LightTx: A Lightweight Transactional Design in Flash-based SSDs to Support Flexible Transactions", IEEE 31st International Conference or Computer Design (ICCD), 2013, pp. 1-8, IEEE. http://www.pdl.cmu.edu/PDL-FTP/NVM/lighttx-ssd_iccd13.pdf.
Zhu et al., "Avoiding the Disk Bottleneck in the Data Domain Deduplication File System", Proceeding FAST'08 Proceedings of the 6th USENIX Conference on File and Storage Technologies, Article No. 18, 2008, 14 pages.
You et al., "Deep Store: An Archival Storage System Architecture", 21st International Conference on Data Engineering (ICDE'05), 2005, 12 pages.
Xie, et al., "Oasis: An active storage framework for object storage platform", Future Generation Computer Systems, vol. 56, Mar. 2016, 14 pages, SimpliVity Exhibit 2007, *Springpath v. SimpliVity* IPR2016-01779.
Wikipedia: "Object Storage" (available at https://en.wikipedia.org/wiki/Object.sub.--storage) (last visited Dec. 6, 2016), SimpliVity Exhibit 2001, *Springpath v. SimpliVity* IPR2016-01779, 9 pages.
Wikipedia: "Namespace" (available at https://en.wikipedia.org/wiki/Namespace) (last visited Dec. 6, 2016), SimpliVity Exhibit 2008, *Springpath v. SimpliVity* IPR2016-01779, 3 pages.
Wikipedia, "Write-Ahead Logging", retrieved from <https://web.archive.org/web/20110130005202/http://en.wikipedia.org:80/wiki/Write-ahead_logging>, Jan. 30, 2011, 1 page.
Webster's New World Computer Dictionary, 10th Ed. 2003, 3 pages.
Webopedia: "Namespace" (available at http://www.webopedia.com/TERM/N/namespace.html) (last visited Dec. 20, 2016), SimpliVity Exhibit 2009, *Springpath v. SimpliVity* IPR2016-01779, 2 pages.
Webopedia: "Inode" (available at http://www.webopedia.com/TERM/I/inode.html) (last visited Dec. 20, 2016), SimpliVity Exhibit 2002, *Springpath v. SimpliVity* IPR2016-01779, 2 pages.
USPTO PTAB Patent Owner's Preliminary Response dated Dec. 27, 2016, *Springpath, Inc. v. SimpliVity Corp.*, Case IPR2016-01780, U.S. Pat. No. 8,478,799 B2 (SimpliVity Exhibits 2001-2009 identical to IPR2016-01779 and previously submitted), 48 pages.
USPTO PTAB Patent Owner's Preliminary Response dated Dec. 27, 2016, *Springpath, Inc. v. SimpliVity Corp.*, Case IPR2016-01779, U.S. Pat. No. 8,478,799 B2 (SimpliVity Exhibits 2001-2009 listed below), 44 pages.
USPTO PTAB Decision Denying Institution of Inter Partes Review entered Mar. 22, 2017, *Springpath, Inc. v. SimpliVity Corp.*, Case IPR2016-01779, U.S. Pat No. 8,478,799 B2, 15 pages.
USPTO PTAB Decision Denying Institution of Inter Partes Review entered Mar. 21, 2017, *Springpath, Inc. v. SimpliVity Corp.*, Case IPR2016-01780, U.S. Pat No. 8,478,799 B2, 15 pages.

USENIX Association, "Proceedings of the First Symposium on Networked Systems Design and Implementation," Mar. 2004, pp. 1-15, San Francisco, CA, USA.
U.S. Patent and Trademark Office Notice of Allowance dated May 29, 2013 in U.S. Appl. No. 12/823,922 (Springpalh Exhibits 1013 & 1113), 12 pages.
U.S. Patent and Trademark Office non-final Office Action dated Aug. 30, 2012 in U.S. Appl. No. 12/823,922 (Springpath Exhibits 1006 & 1106), 32 pages.
Understanding Object Storage and Block Storage use cases, Jul. 20, 2015 (available at http://cloudacademy.com/blog/object-storage-block-storage/) (last visited Dec. 22, 2016), SimpliVity Exhibit 2005, *Springpath v. SimpliVity* IPR2016-01779, 9 pages.
The EMC Centera and TOWER Technology Advantage, EMC White Paper, Jul. 2002, pp. 1-8.
Stevens. et al., "The first collision for full SHA-1," International Association for Cryptology Research 2017, pp. 570-596.
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1, 159 pages.
SNIA, "NVM Programming Model (NPM)", Version 1, SNIA Technical Position, Dec. 21, 2013, 85 pages.
Simplivity Corporation's Reply Claim Construction Brief, Case 4:15-cv-13345-TSH, Document 132, Jul. 24, 2017, pp. 1-23.
Simplivity Corporation's Opening Claim Construction Brief, Case 4:15-cv-13345-TSH, Document 130, Jul. 10, 2017, pp. 1-21.
SimpliVity Corporation's Markman Hearing Transcript, Case No. 15cv13345-TSH, Aug. 16, 2017, pp. 1-119.
Sang-Won Lee, et al., "A Case for Flash Memory SSD in Enterprise Database Applications," Proceedings of the 2008 ACM SIGMOD International Conference on Management of Data (2008), pp. 1075-1086.
Sandberg et al. "Design and Implementation of the Sun Network Filesystem", Sun Microsystems, Mountain View, CA (12 pp) (Springpath Exhibits 1004 & 1116) Dec. 27, 2016.
Ritchie et al., "The UNIX Time-Sharing System", Communications of the ACM, vol. 17, Jul. 1974, pp. 365-375.
Rhea et al., Fast, "Inexpensive Content-Addressed Storage in Foundation", Proceeding of USENIX 2008 Annual Technical Conference, 2008, 14 pages.
Response to U.S. non-final Office Action dated Aug. 30, 2012 filed Dec. 18, 2012 in U.S. Appl. No. 12/823,922 (Springpath Exhibits 1009 & 1109), 148 pages.
Response to U.S. final Office Action dated Feb. 22, 2013 filed May 8, 2013 in U.S. Appl. No. 12/823,922 (Springpath Exhibits 1012 & 1112), 48 pages.
Ragib Hasan, et al., "A Survey of Peer-to-Peer Storage Techniques for Distributed File Systems," International Conference on Information Technology: Coding and Computing, 2005, 9 pages.
R. Rivest, "The MD5 Message-Digest Algonthm," Request for Comments 1321, Internet Engineering Task Force, CSCO-1017, Apr. 1992, 21 pages.
Quinlan et al., "Venti: a new approach to archival storage", Bell Labs, Lucent Technologies, 1-13 pp (Springpath Exhibits 1008 & 1108).
Prosecution History of the U.S. Pat. No. 8,478,799 patent, 576 pages.
Presentation: "Object Storage technology," Storage Networking Industry Association, 2013 (available at http://www.snia.org/sites/defaull/education/tutorials/2013/spring/file/BrentWelch_Object_Storage_Technology.pdf) (last visited Dec. 22, 2016), SimpliVity Exhibit 2003, *Springpath v. SimpliVity* IPR2016-01779, 42 pages.
Preliminary information, AMD Athlon, Processor Module Data Sheet, AMD .Athlon, Publication #21016, Rev. M, Issue Date:,Jun. 2000, 74 pages.
Prashant Shenoy, et al., "Symphony: An Integrated Multimedia File System," Proceedings of SPIE 3310, Multimedia Computing and Networking 1998, pp. 124-138.
Prashant Shenoy, "Declaration of Prashant Shenoy. PhD, Under 37 C.F.R. .stcn. 1.68 in Support of Petition for Inter Partes Review of U.S. Pat. No. 8,478,799", dated Aug. 11, 2017, 196 pages.

(56) References Cited

OTHER PUBLICATIONS

Pmem.io, "Persistent Memory Development Kit", Persistent Memory Programming, available online at <https://web.archive.org/web/20180121183956/http://pmem.io:80/pmdk>, Jan. 21, 2018, 3 pages.
Petitioner's Reply to Patent Owner's Preliminary Response, Case IPR2017-01933, U.S. Pat. No. 8,478,799, Feb. 28, 2018, pp. 1-17.
Petition for Inter Partes Review of U.S. Pat. No. 8,478,799 before the USPTO Patent Trial and Appeal Board dated Sep. 14, 2016, Case IPR2016-01780, 66 pages.
Petition for Inter Partes Review of U.S. Pat. No. 8,478,799 before the USPTO Patent Trial and Appeal Board dated Sep. 14, 2016, Case IPR2016-01779, 59 pages.
Petition for Inter Partes Review of U.S. Pat. No. 8,478,799 filed Aug. 11, 2017, case IPR2017-01933, 92 pages. The citations from PIR2017-01933 are submitted herewith below.
Patent Owner's Preliminary Response Pursuant to 37 CFR 42.107(a), Case IPR2017-01933, U.S. Pat. No. 8,478,799, Dec. 21, 2017, pp. 1-47.
Object Storage versus Block Storage: Understanding the Technology Differences, Aug. 14, 2014 (available at http://www.druva.com/blog/object-storage-versus-block-storage-understandi-ng-technology-differences/) (last visited Dec. 22, 2016), SimpliVity Exhibit 2004, *Springpath* v. *SimpliVity* IPR2016-01779, 7 pages.
OBFS: A File System for Object-based Storage Devices, Feng, et al., 2004, SimpliVity Exhibit 2006, *Springpath* v. *SimpliVity* IPR2016-01779, 18 pages.
Nitin Agrawal, et al., "Design Tradeoffs for SSD Performance," USENIX'08: 2008 USENIX Annual Technical Conference, Jun. 25, 2008, pp. 57-70.
Bibliographic Record information, "The Design and Implementation of the FreeBSD Operating System", 2005, available at the online catalog of the Library of Congress, accessed Aug. 3, 2017. 4 pages.
Debnath et al, "ChunkStash: Speeding up Inline Storage Deduplication using Flash Memory" 2010 USENIX Annual Technical Conference (ATC), 2010, 15 pages.
Defendant Springpath, Inc.'s Preliminary Claim Construction Brief with Exhibits, Case 4:15-cv-13345-TSH, Document 129, Jul. 10, 2017, pp. 1-138.
McKusick et al., "A fast file system for UNIX", ACM Transactions on Computer Systems (TOCS), vol. 2, 1984, 17 pages.
Michele Nelson, "Declaration of Michele Nelson, Under 37 C.F.R .sctn. 1.68", dated Aug. 9, 2017, 91 pages.
Muthitacheroen, A., et al., "Ivy: A Read/Write Peer-to-Peer File System" Proceedings of the 5th Symposium on Operating Systems Desing and Implementation (OSDI '02), Operating Systems Review, vol. 36, Issue SI (Winter 2002), 14 pages.
PMEM.IO. "NVM Library Overview", Persistent Memory Programming, available online at <https://web.archive.Org/web/20140916002916/http://pmem.io:80/2014/09/01/nvm-library-overvieiw.html>, Sep. 1, 2014, 3 pages.
U.S. Provisional App. Filed on Jun. 26, 2009, 26 pages., U.S. Appl. No. 61/269,633.
US Patent and Trademark Office final Office Action dated Feb. 22, 2013 in U.S. Appl. No. 12/823,922 (Springpath Exhibits 1010 & 1110), 25 pages.
"A Scalable Indexing Technique and Implementation for Big Spatial Data," Jan. 16, 2017, Thermopylae Science + Technology, pp. 1-34.

\* cited by examiner

TRANSACTION ENCODING AND TRANSACTION PERSISTENCE ACCORDING TO TYPE OF PERSISTENT STORAGE

BACKGROUND

File systems are used to control how data is stored and retrieved. A file system may allow differentiation of information placed in a medium. One method of differentiating the information on a medium is to separate the data into pieces and to give each piece a name. There are different kinds of file systems having different structures, logical basis, properties of speed, flexibility, security and size and the like.

Federated systems are a collection of nodes. In an example, the nodes may act in a peer-to-peer network without a centralized authority. In a decentralized network, peers communicate among themselves to resolve state. The nodes in the federated system may communicate with each other regarding the underlying state including the state of the file system.

BRIEF DESCRIPTION OF DRAWINGS

Examples are described in detail in the following description with reference to the following figures. In the accompanying figures, like reference numerals indicate similar elements.

DETAILED DESCRIPTION OF EMBODIMENTS

Figure 1:
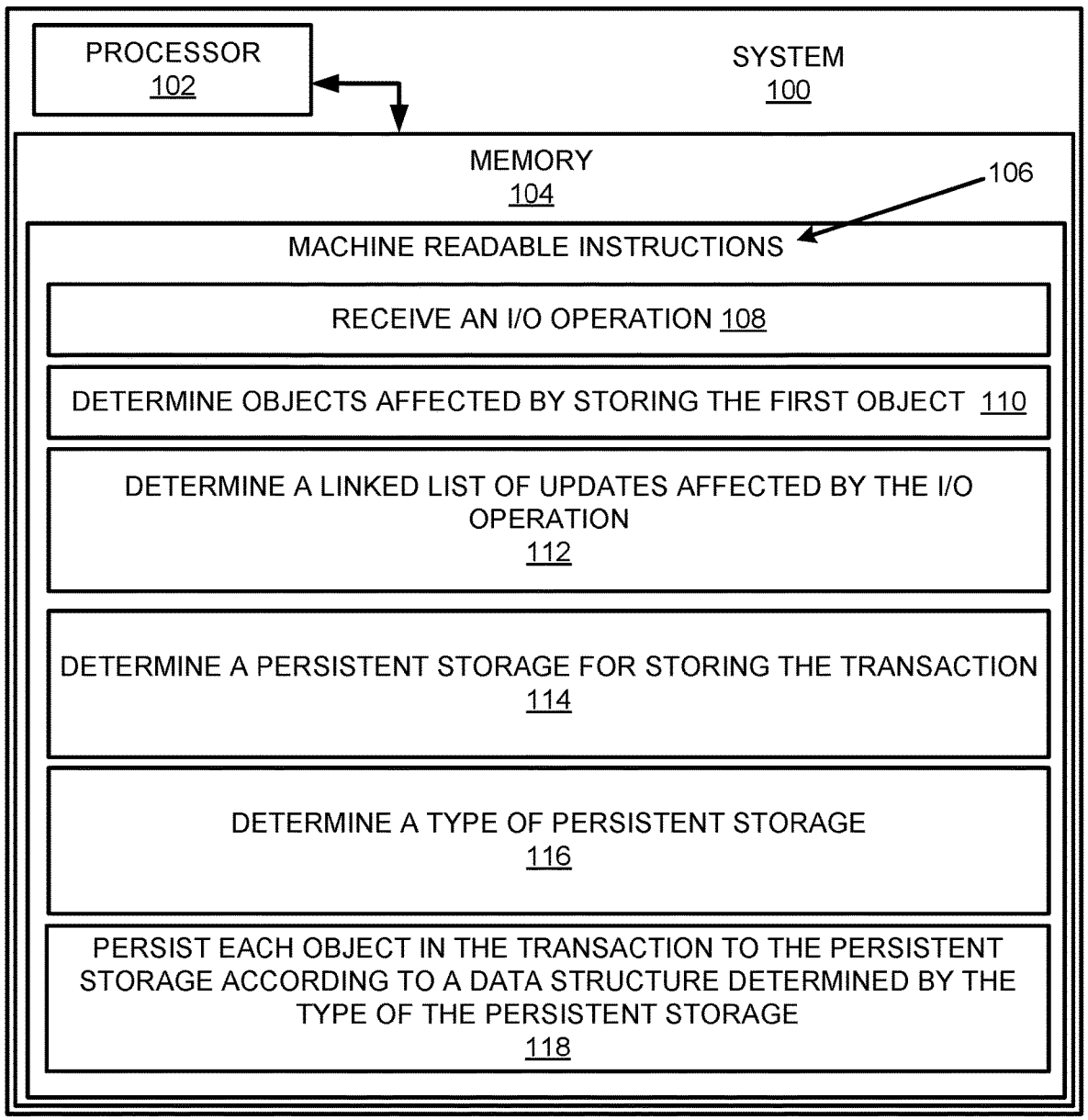
FIG. 1 illustrates an example of a system for transcoding an input/output (I/O) operation into a transaction including a linked list of updates, and persisting the transaction according to a data structure determined by a type of persistent storage that is available for storing the linked list of updates.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well-known methods and/or structures have not been described in detail so as not to unnecessarily obscure the description of the embodiments.

According to an example of the present system, the system may encode an I/O (Input/Output) operation in an object store into a transaction to maintain consistency between objects represented in the object store and the transaction stored in a persistent storage, independent of the hardware configuration of the object store and the type of storage media (e.g., SSD, NVRAM, and the like) used to implement the persistent storage. In an example, a transaction may include a linked list of changes that documents the changes to objects represented in the object storage. The object store may represent objects that are related to a root object and objects that describe the relationship between the objects and the root object. In an example the relationship between the objects and the root object may be mathematically described by a Directed Acyclic Graph (DAG). The use of the transaction may allow the system to maintain ACID (Atomicity, Consistency, Isolation, and Durability) properties between the objects represented in the object store and the transactions stored in the persistent storage.

To encode the I/O operation into a transaction, a volume manager may store a first object or modify the first object (e.g., if the first object already exists) in response to an I/O operation on a persistent storage. Also, the system may modify the DAG to represent the first object in the object store. In addition to the direct changes to the object store, representing the first object in the object store may result in concomitant changes to associated objects represented in the object store. For example, the metadata objects such as the object record of the first object, the object index storing the object record may change as a result of changes in the DAG to accommodate the first object in the hierarchy of objects.

In an example, the system may encode changes to objects represented in the object store in the form of a transaction containing a linked list of updates. The linked list of updates may document the changes as a result of the first object being accommodated in the object store. For example, the linked list of updates may document the change between an object represented in the object store prior to the I/O operation and the same object in the object store subsequent to the I/O operation. For example, a transaction may include the changes to the object record, the object record, storage allocation table, file system intent log and the like prior to and subsequent to the I/O operation. The system may then determine an available persistent storage for storing the transaction. In an example, the system may use the type of the persistent storage available to determine a data structure for storing the linked list of updates in the persistent storage. For example, the system may use a certain data structure to store the transaction on non-volatile RAM (NVRAM) and another data structure to store the transaction on a Solid State Drive (SSD).

In an example, encoding of the I/O operation to a transaction containing a linked list of updates may be a public function. The system may use this public function to modify the representation of the objects in the object store while maintaining consistency between the representation of objects in the object store and the transactions that are persisted to the persistent storage. For example, the object store may interface with a layer housing virtual machines. The system may provide public functions to store the objects represented in the object store based on I/O requests from the layer housing the virtual machines. The virtual machine layer may generate I/O requests for retrieval from or storage to the object store. The public function may allow the system to deduplicate, store and efficiently retrieve the objects represented in the object store. The system may then record any changes to the object store irrespective of the type of hardware used to implement the object store. The function of storing the transaction on persistent storage may be a private function. The system may perform this function using one or more drivers tailored to the type of persistent storage. In an example, the public functions may remain the same between hardware platforms while the private functions may be different for different persistent storage types. Thus the use of a transaction, the public function and/or the private function may allow the system to maintain consistency between the changes to the DAG in the object store (e.g., changes to the objects represented in the object store) and the transactions stored in the persistent storage as a result of the I/O operation.

For example, the system may access the private function optimized for a type of persistent storage to store or retrieve the transaction. For example, assume the persistent storage available for storing the transaction is an SSD. In SSD's, the mean time between failures may be increased by reducing write amplification. Write amplification in an SSD may increase when a region with a prior transaction is overwritten to replace the prior transaction with another transaction in the same region. In an example, the system may use a log-based data structure for persisting the transaction to an SSD. The log-based data structure may minimize write amplification. For example, the system may commit transactions to the persistent storage in a series of logs stored in contiguous memory reserved for storing the transaction or parts of the transaction. A log entry in the series of logs may reflect the changes between the current transaction and the previously stored transaction on the persistent storage. Thus, the life of the SSD (i.e., the mean time between failure) may be increased by using the log data structure for SSDs.

In another example, assume the persistent storage available is NVRAM. In NVRAM storage, the transaction may be byte addressable. Therefore in an NVRAM, the transaction present may be replaced at a byte level with no additional movement of bytes adjacent to the transaction or minimal additional bytes moved. Therefore, the NVRAM storage may not experience increased mean time between failures (MTBF) when compared to the SSD's when replacing stored data in-situ. Therefore, the system may commit the transactions to overwrite the previously stored transactions directly (i.e., make changes at a byte level) in the case of NVRAM. However, it may be beneficial to enhance the responsiveness of the object store incorporating NVRAM by using a temporary staging area (e.g., an internal buffer) on the NVRAM to store the transaction temporarily before overwriting the prior transaction in the NVRAM. The system may thus use a data structure that stores the transactions directly on the NVRAM and update the prior transaction stored on the object store.

Also, in another example, to store the transaction in an SSD, the system may use a temporary buffer external to the SSD to collect one or more transactions before persisting the transaction to the SSD. The system may for example, collect transactions until the buffer becomes full and can no longer store another transaction or until a timeout occurs. In an example, using the timeout may allow the system to acknowledge storage of the transactions in persistent storage periodically when there are no further transactions available to pack the buffer size. Thus the system may optimize the storage of the objects in persistent storage based on the type of storage.

A technical problem with a peer-to-peer storage system is difficulty with consistent performance across different system hardware used for storage and across different persistent storage types. In an example, the system specification for storage systems may be commodity servers or cloud services. The I/O operation storing the first object may affect the other objects as described above. In an example, the objects in the DAG may be changed all the way to the root object due to change as a result of the I/O operation. In commodity servers and cloud services, the constant renewal or agitation of the DAG may result in higher CPU utilization and a reduction in Input-Output Operations Per Second (IOPS). Also, the different types of persistent storage may experience varying rates of wear. For example, the MTBF may increase for SSD drives due to constant changes to the same region in the SSD.

The system according to an example described below may be used on commodity servers and cloud services by abstracting the I/O operation in a public function encoding the transaction irrespective of the system specification and a private function storing the transaction according the type of the persistent storage. The private function may persist the transaction to the persistent storage irrespective of the persistent storage type using device drivers optimized for the storage type.

Another technical problem with a peer-to-peer storage system is maintaining ACID consistency for I/O operations across different system hardware used for storing data in the storage and across different persistent storage types. Also, the consistency between the representation of objects in the object store and the transactions stored in the persistent storage.

The system according to an example described below may discard all changes or persist all changes in a transaction to maintain the ACID consistency of the I/O operation. Also, the system may maintain the order of transactions using an immutable record.

FIG. 1 shows an example of a system 100, according to an example of the present disclosure. The system 100 may include a processor 102 and a memory 104. The memory 104 may be a non-transitory computer-readable medium. The system 100 may include machine readable instructions 106 stored on the non-transitory computer-readable medium executable by the processor 102 cause the system 100 to perform the functions described in detail below.

In an example, the system 100 may implement an object store on a peer-to-peer network of nodes, and each node in the network of nodes may include a local persistent storage for storing objects of the object store. An object may include data and/or metadata. The object store may be a virtual layer storing and maintaining objects. Each network node may be implemented on servers, specialized hardware, a hybrid of servers and/or specialized hardware. The local persistent storage may store objects of the object store. The system 100 may use an object store to store objects on the local persistent memory. In examples, the object store may be based on a globally unique signature, or a name generated using a cryptographic function (e.g., a hashing function). For example, creating a new object creates a unique identifier for the new object according to the cryptographic function. Modifying an existing object on the object store may create a modified object stored with a new identifier alongside or instead of the existing object. The objects of the object store may be stored in the local persistent memory of a node in the case of a federated network of peer-to-peer nodes. In another example, the objects of the object store may be stored on a persistent storage of a computer such as a server, a workstation, a laptop computer, a network storage device or the like.

In an example, the object store may be a DAG. A DAG may consist of objects that exhibit a hierarchal relationship from a root object to a child object. The DAG may include many vertices (objects) and edges (pointers to objects), with each edge directed from one vertex to another such that starting at any random vertex and following a consistently directed sequence of edges does not eventually loop back to the random vertex again. Also, the DAG may include a topological ordering such as a sequence of vertices where every edge is directed from an earlier vertex to later vertex in the sequence. In an example, the DAG may be a blockchain storage. The blocks in the blockchain may be the vertices, and the edges may be pointers to other objects. In an example, an edge may point to the last block of the blockchain or may be abandoned objects in the blockchain such as forks. In an example, the object store may be a DAG with a root object that includes the signature of a child object, the child object in turn including the signature of its child object and so on ending in a leaf object (an object with no child object). The object store may thus have a hierarchical structure where the topological ordering is directed from the root object to the farthest child object in the sequence.

The system 100 may include the machine-readable instructions 106 executable by the processor 102. The machine-readable instructions 106 may include the instructions 108 to receive an I/O operation. In an example, the object store may receive an I/O operation from a virtual machine running on a layer above the object store. The object store may be an opaque store that represents objects stored on a node. The system 100 may store objects on a local persistent storage in a node.

In an example, the system 100 may determine the I/O operation stores a new object (e.g., the first object), modifies an existing object (e.g., the first object) or deletes an existing object (e.g., the first object) in the system. The system 100 may use a volume manager to store a first object that may be affected by the I/O operation in a persistent storage. The volume manager may store the first object in a persistent storage. However, the representation of the first object in the object store requires additional changes to objects in the object store.

The machine-readable instructions 106 may include instructions 110 to determine objects represented in the object store affected as a result of storing the first object. In an object store, accommodating an object in the DAG may change other objects in the object store. An object store may include metadata objects documenting the DAG and data objects. Accommodating the new object (e.g., the first object) in the object store may change metadata objects associated with the new object (e.g., the first object) in the object storage. For example, the new object (e.g., the first object) when represented in the object store may result in an object record for the new object (e.g., the first object) in an object index. In another example, a request to store an object (e.g., the first object) already stored in the object store may change the object record for the already stored object.

For example, to determine the linked list of updates, the volume manager may return an address where the first object is stored. The object store may record the address in an object record associated with the first object. Also, the object store may update the object index with the object record, the intent entries and the like. Thus, the act of representing the first object in the object record leads to a cascading set of changes in the object record. The instructions 112 may thus determine objects represented in the object store affected by storing the first object.

In an example, the system 100 may include instructions 112 to determine or encode a transaction containing a linked list of updates as a result of the I/O operation. The instructions 110 may determine or encode the transaction to include the changes to the objects represented in the object store as a result of accommodating the first object in the DAG. In an example, the linked list of changes may include changes to an object record of the first object, changes to the object index of the object store, changes to the intent entries and the like. In another example, the linked list of changes may point to a location in a DAG where the affected objects are located in hierarchy in the object store. For example, updates in the linked list of updates may represent changes to objects at a hierarchical distance from the root object and at an offset from an initial object located at the hierarchical distance. Thus, the linked list of updates may show the changes between a prior object record of the first object and an updated object index of the first object in the object store prior to the I/O operation.

In an example, the system 100 may encode or determine the transaction in such a way that the transaction including the linked list of updates maintains an ACID consistency between the representation of objects in the object store and the transaction stored in the persistent storage. In an example, the ACID consistency of objects represented in the object store may mean Atomicity, Consistency, Isolation and Durability. Atomicity may mean, either all changes in a transaction are applied to a persistent storage or none of the changes in the transaction are applied to the persistent storage. Also, Atomicity may indicate the changes in the object store to accommodate the first object are all rejected or applied when the transaction is stored in the persistent storage. For example, the system 100 may write apply changes to both the object storage and the persistent storage or not make both changes. In the case of power failures, partial transactions may be reversed before the transactions are applied again. Consistently may mean that contents of affected data structures remain valid from one transaction to the next transaction. Isolation may mean that each transaction is a self-contained set of changes to similar objects represented in the object store and the corresponding transaction stored in the persistent storage. Also, isolation may mean multiple transactions may be persisted to the persistent storage concurrently in isolation from one another. For example, the same object may be affected by one or more transactions in an I/O operation. The order of transactions may be important in some instances while the order of transactions may not be important in other instances.

For example, concurrent updates to a first object record of a first object and a second object record of a second object may not be affected by the order in which these changes are persisted to the object store. In this example, the transactions may be isolated, and may therefore be processed concurrently. However, concurrent updates from a first I/O operation and a second, I/O operation or a first transaction of the first I/O operation and a second transaction of the first I/O operation to the first object may be affected by the order in which the transactions are persisted and the corresponding changes made to the object store to accommodate the changes to the first object. For example, the first object's object record may be updated by the first transaction and the second transaction. The system may process the first transaction and the second transaction to persist the transactions to the persistent storage in the order in which the transaction or operation is received. In an example, the system may generate a mutable entry in the object store to ensure the transactions are persisted in the right order to the persistent storage where a different order of the transactions may result in a different DAG in the object store inconsistent with the transaction stored in the persistent storage. For example, the object record may have an immutable entry locking changes to the object record until the first transaction is persisted to the persistent storage. Thus, the system may determine the order of the transaction and the prior transaction to persist the transactions to the persistent storage in the right order to maintain ACID consistency. Durability may mean that once the transaction is persisted, the operation is guaranteed to be persisted on the persistent storage following a power failure or failure of hardware or software resulting in an exception (e.g., a crash of the software).

The machine-readable instructions 106 may include instructions 114 to determine a persistent storage for storing the linked list of updates. In an example, the persistent storage may be determined based on space available in a persistent storage array, current usage of the input/output interface to the persistent storage, how quickly the I/O request should be acknowledged to the layer on top of the object store (e.g., a virtual machine), and the like.

The machine-readable instructions 106 may include instructions 116 to determine a type of the persistent storage. The system 100 may use the type of storage to determine the data structure that causes less wear (or in some implementations, the least wear) for the type of the persistent storage and/or improve the IOPS of the persistent storage. In an example, the persistent storage may be an SSD. For example, the SSD may have a lower life expectancy if it is subject to write amplification.

In another example, the persistent storage may be an NVRAM storage. The system 100 may directly overwrite the regions in the NVRAM unlike SSD because NVRAM storage is byte addressable. In an example, the system 100 may use a portion of the NVRAM storage as an internal buffer to temporarily store the linked list of objects to acknowledge the I/O operations quicker. Thus, the system 100 may determine the type of persistent storage to identify an appropriate private driver based on the type of persistent storage.

The instructions 106 may include instructions 118 to persist each update in the transaction to the persistent storage according to a data structure determined by the type of the persistent storage. The instructions 118 may decode the transaction to determine the updates to regions in the persistent storage. In an example, decode the transaction may mean determine the objects represented in the object store that are updated by the transaction. For example, the transaction may include updates to the object record, the object index, the intent logs and the like. The instructions 118 may decode the transaction to determine an update to an object represented in the object store and the corresponding change in the persistent storage.

In an example, assume the persistent storage is an SSD. The instructions 116 may use a data structure (e.g., a log-based file system) for the SSD that may reduce write amplification. For example, the instructions 116 may use a log that may store the difference between a prior transaction and the current transaction in a log. In an example, the instructions 116 may persist the log in a contiguous space in the SSD to avoid write amplification. In an example, to avoid write amplification in an SSD, the instructions 116 may use an external buffer to collect one or more transactions to minimize the number of writes to the SSD. In an example, the buffer may be of a specific size (e.g., 4 kibibyte (KiB), 8 KiB, 64 KiB blocks).

In an example, the log containing one or more transactions collected in the buffer may be persisted after a timeout (e.g. 8 microseconds, 16 microseconds, 32 microseconds, and the like) to provide an acknowledgment of the I/O operation to the layer above the object store (e.g., a layer of virtual machines).

In another example, the persistent storage may be an NVRAM storage. Examples of data structures for NVRAM may include direct byte addressed storage. In an example, the system may store changes that correspond to a type of object represented in the object store in a region in the persistent storage. For example, the part of the transaction indicating changes to an object record may be stored in a region storing object records on the NVRAM. In an example, the instructions 116 may use a portion of the NVRAM as a temporary staging area and acknowledge the I/O. The system 100 may then determine the persistent storage regions that correspond to linked list of updates in the transaction. The private function such as device driver for the NVRAM may then persist changes to the linked list of objects to the corresponding objects in the NVRAM.

In an example, the system 100 may acknowledge the I/O after the transaction is saved in the persistent storage. Thus, the system 100 may persist the transaction in the persistent storage using a data structure optimized for the type of persistent storage. In case of failure to persist and the I/O is lost (e.g., power failure on a RAM-based system configuration for the object store), the system 100 may receive the I/O again from the virtual layer above the object stores after the I/O times out or is not acknowledged by the system 100. For example, the system 100 may prevent a mismatch between the representation of objects in the object store and the linked list of updates stored on the persistent storage.

The system 100 may maintain ACID consistency when persisting transactions, by determining whether a prior transaction affects a current transaction. For example, a part of the prior transaction (e.g., an update to an object record of the first object) may affect a part of the current transaction (e.g., another update to an object record of the first object). In an example, the system 100 may use an immutable entry in the object index to indicate the first transaction associated with the first object should be stored first and the DAG updates in the object store before the second transaction is processed. The system 100 may use the immutable entry to determine the parts of a transaction that may not be persisted until the first transaction associated with the first object is persisted. In an example, the system 100 may prioritize persisting the immutable entry (i.e., an indication of the linked list of changes associated with the first object having priority over another linked list of changes) and persist the immutable entry as soon as the transaction associated with the first object is determined irrespective of the type of persistent storage.

The system 100 may, based on the determination that the prior transaction affects the current transaction, determine a sequence of the prior transaction and the current transaction. The system 100 may persist the transactions based on the determined sequence of transactions. For example, the system 100 may process the transactions in the order the transactions were received, i.e., the prior transaction and the current transaction. In another example, the system 100 may persist the transaction in an order that may prevent an exception. For example, the prior transaction may move an object created in a later transaction. The system 100 may process the later transaction before the prior transaction to avoid the exception.

The system 100 may include instructions to decode the transaction and determine whether the prior transaction affects the current transaction as discussed above. Based on the determination that the prior transaction affects the current transaction, the system 100 may delay persisting the current transaction until the prior transaction is persisted. In an example, the system 100 may use an external buffer as discussed above for an SSD to delay the current transaction until the current transaction is persisted. In another example, the system 100 may use a portion of the persistent storage as discussed above for an NVRAM storage to delay a transaction in an internal buffer. The system 100 may thus avoid transient changes from each transaction that may repeatedly percolate to the root object resulting in an increase in the input/output operations per second IOPS for the object store.

Figure 2:
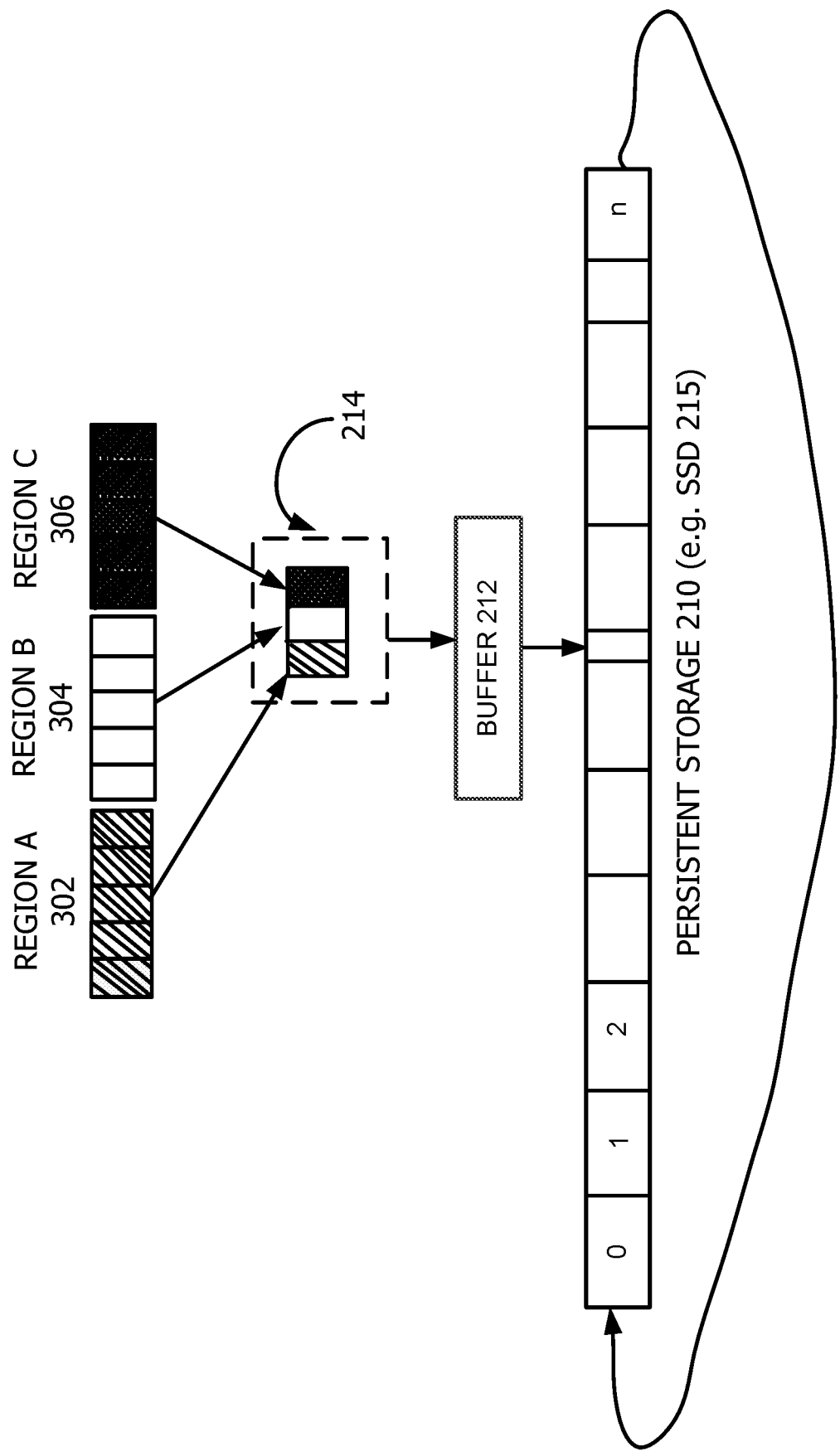
FIG. 2 and FIG. 3 illustrate examples of a system storing a transaction in persistent storage based on the type of the persistent storage.

Referring to FIG. 2, the figure illustrates an example of storing a transaction (e.g., a linked list of objects) in persistent storage based on the type of the persistent storage 210 (e.g., an SSD). In an example, the system 100 may determine a linked list of updates (shown as region A 202, region B 204 and region C 206) that may reflect changes to objects in the object store that may be affected by storing the first object in the persistent storage and accommodating the first object in the DAG. The system 100 may encode a transaction 214 that includes the linked list of changes to the object store as a result of storing the first object. For example, the transaction 214 may include the linked list of updates to objects represented in the object store shown in FIG. 2 as the region A, region B and region C. In an example, region A may refer to the changes to the object record of the first object, region B may refer to the changes to the storage allocation and the like.

In an example, the system 100 may use a log or journal data structure for storing transactions on an SSD. In an example, the system 100 may package one or more transactions in a buffer 212 of a fixed size (e.g., 4 KiB, 8 KiB, 64 KiB). In an example, the buffer 212 may be a non-volatile memory that may survive a power failure or an exception (e.g., a software or hardware crash). The system 100 may determine a log containing one or more transactions in the buffer 212. The log may document changes between a prior transaction stored in the SSD and the one or more transactions in the buffer 212. The system 100 may then persist the log to the persistent storage 210. In an example, the persistent storage 210 may include the logs 0, 1, 2 to n as shown in FIG. 2.

In an example, the buffer 212 may be full when an additional transaction may no longer be stored in the buffer 212. The system 100 may commit the log, i.e., the buffer 212 with one or more transactions to the persistent storage as a journal log stored on the SSD 210 when the 4 KiB buffer is full. In an example, the system 100 may store the log in a contiguous space on the SSD. In another example, the system 100 may commit or persist the 4 KiB buffer with changes to the persistent storage 210 after a timeout. In an example, the buffer timer may be set to 800 μS. Although described using 4 KiB buffer sizes above and a buffer time out of 800 μS, different buffer sizes and buffer timeouts may be used in different examples.

Figure 3:
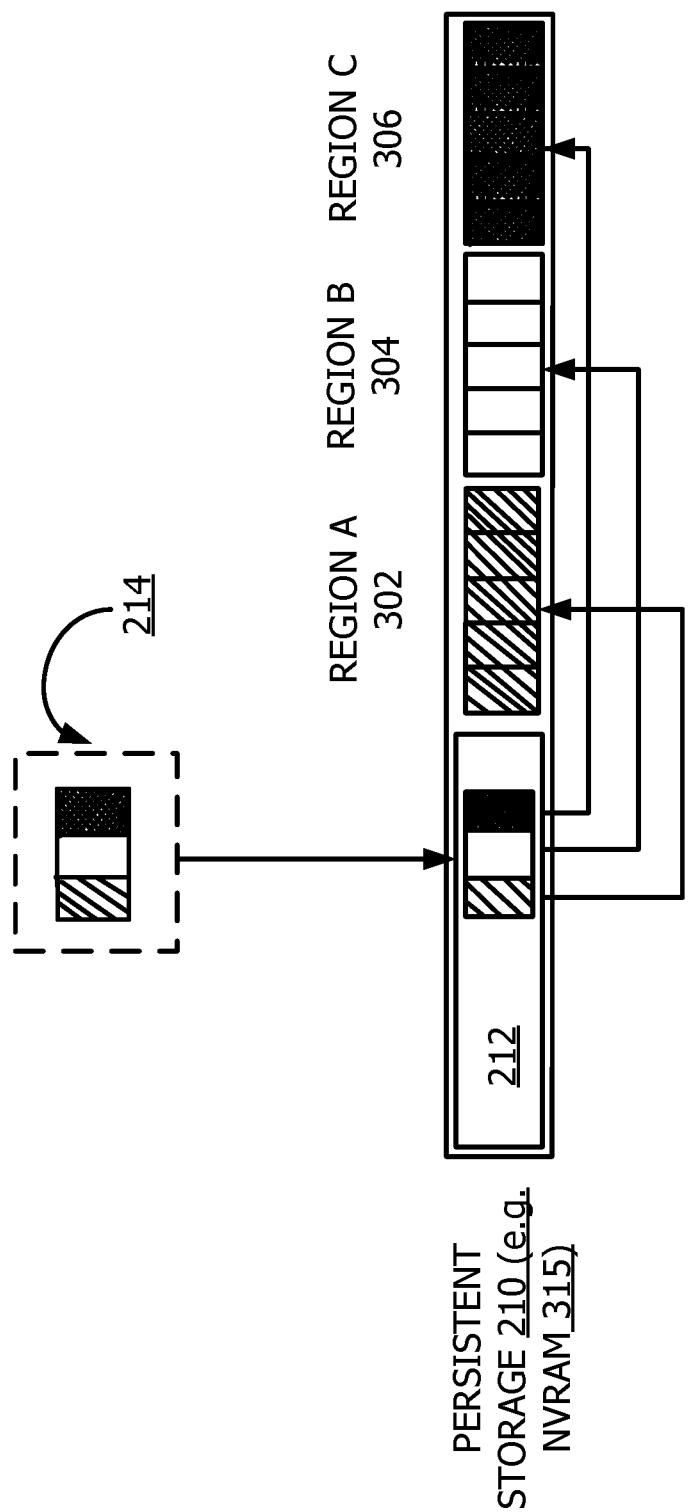

Referring to FIG. 3, the figure illustrates an example of storing a transaction (e.g., a linked list of objects) in persistent storage based on the type of the persistent storage 210 (e.g., an NVRAM). In an example, the system 100 may determine a linked list of updates (shown as region A 202, region B 204 and region C 206) that may be affected by storing the first object in the persistent storage. The system 100 may encode a transaction 214 that includes the linked list of updates affected by storing the first object. For example, the transaction 214 may include the linked list of updates to objects represented in the object store shown in FIG. 2 as the region A, region B and region C. In an example, region A may refer to the object record of the first object, region B may refer to the object index and the like.

In an example, the system 100 may use a staging area (e.g. buffer 212) to store a transaction. The staging area may be considered as an internal buffer as shown in the Figure. The system 100 may then determine the corresponding regions in the persistent storage 210 (e.g. NVRAM) that correspond to the updates in the linked list of updates in the staging area (e.g., buffer 212). For example, the region A 302 in the persistent storage 210 may store the object record of the first object; the region B 304 may store the changes to the storage allocation and the like. The system 100 may then modify the region A 302 based on the linked list of changes in the staging area 212. In another example, the system 100 may store the changes to the object record of the first object next to the previous changes to the object record of the first object, i.e., region A 302. Similarly, the system 100 may then modify the region B 304 (e.g., the region storing changes to the storage allocation). Thus the system 100 may persist the transaction 214 to the persistent storage 210 (e.g., NVRAM) based on the data structure that may be optimized to the persistent storage 210.

Figure 4:
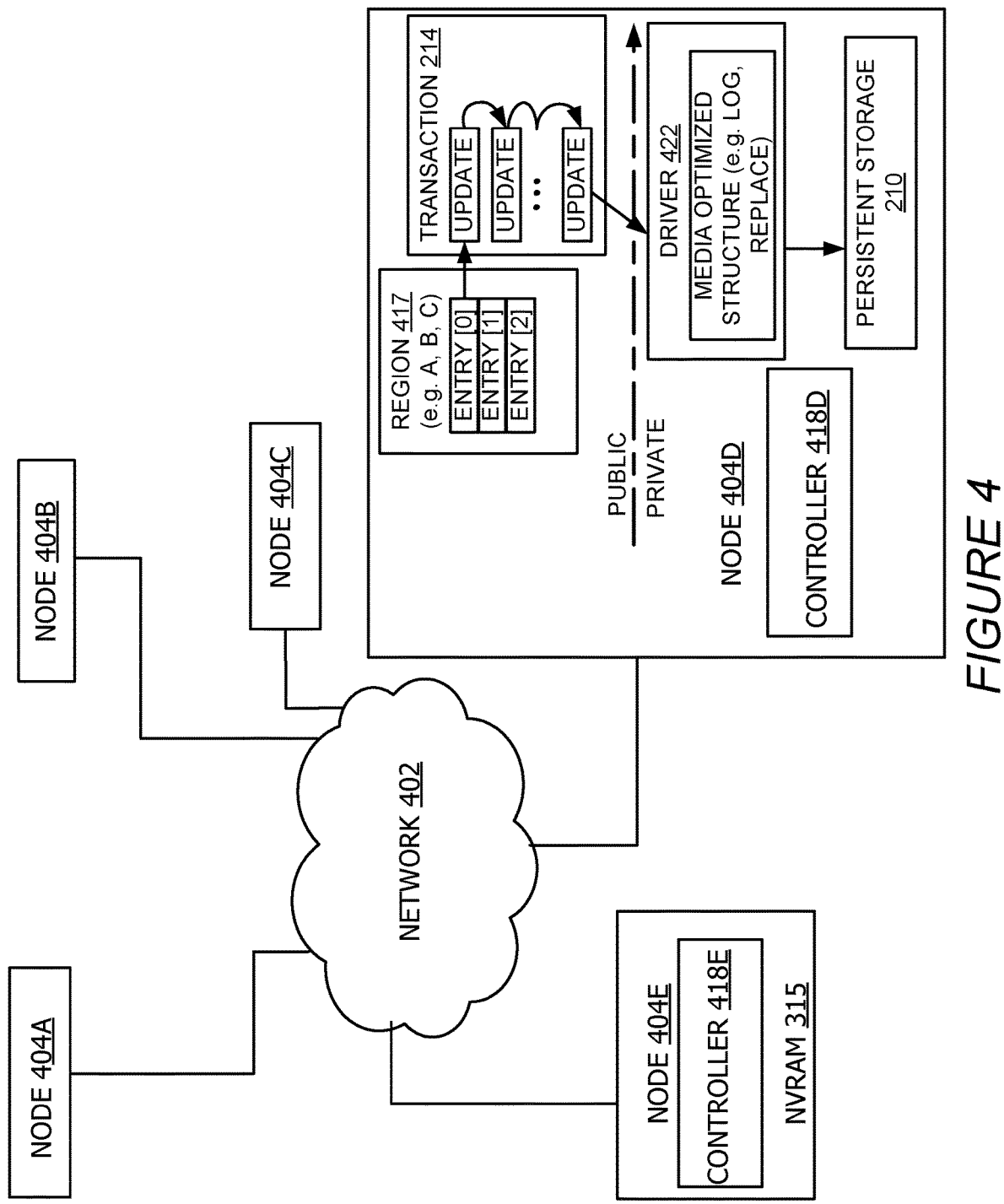
FIG. 4 illustrates an example of a system comprising a federated system of nodes with different media types to persist a transaction.

FIG. 4 depicts an example of the system 100 implemented as a federated system of nodes. The nodes 404 shown as 404A-E may interact through a network 402. The network 402 may be any network such as a local area network, a wide area network and the like. In an example, the network may be a wireless network such as a microwave link, a satellite link, a cellular link, a laser link, a fiber optic network, and the like. In an example, the nodes may be collocated within the same facility. In other examples, the nodes may be located in distinct geographical locations. The nodes 404 may include controllers 418 shown as 418E and 418D, a processor and machine-readable instructions as described above with reference to FIG. 1. In an example, a controller may be implemented as a virtual controller, a hardware controller or a hybrid. The nodes 404A, 404B, 404C, 404D and 404E may each include an object store. The object stores may synchronize objects between the object stores based on policy.

The controllers 418 may manage and maintain the object store. A node, such as node 404D, may receive an I/O request. The I/O request may affect a first object represented on the object store. For example, the I/O may store a new object, modify an existing object or delete an existing object in the persistent storage and change the DAG of the object store. The controller 418D may determine a linked list of updates to objects represented in the object store affected by the I/O operation. In an example, storing the new object (e.g., the first object) may create an object record for the new object in the object index. In another example, an I/O request may affect the representation of an object (e.g., the first object) already stored in the object store. The I/O request may request storage of an object already represented in the object store. The controller 418D may determine the object record of the already existing object (e.g., the first object) and may change i the object record by updating a reference count of the first object. Thus, the controller 418D may determine a linked list of objects that may be affected by the I/O operation. The controller 418D may include a public interface available to a layer above the object store located on the node 404D such as a virtual machine layer. In an example, the system 100 may choose a node such as node 404D may be chosen to store an object.

The controller 418D may store the first object (due to the I/O operation) in the persistent storage 210 on the node 404D. The controller 418D may generate a transaction 214 that includes the linked list of updates that documents changes to objects in the object store affected by storing the first object in the persistent storage and changing the DAG to accommodate the first object in the object store. For example, the transaction may encapsulate changes to the object store as a result of storing the first object. In an example, the updates may indicate changes to objects represented in the object store. In an example, the locations where the updates are stored in the persistent store 210 may not be included in the transaction 214. The region 417 for example, may correspond to the regions A, region B and region C as discussed with reference to FIG. 2 and FIG. 3. The controller 418D may encapsulate changes to objects represented in the object store using a public function accessible from a virtualization layer above the object store. For example, the entry [0] of the region 417 may refer to the object record of the first object. The node 404D may include a private layer that may include specific drivers (e.g. driver 422) that may then decode the transaction and persist the transaction to the persistent storage based on the type of persistent storage. In an example, the driver 422 for persistent storage on node 404D may determine a data structure (e.g., log or replace) for persisting the transaction to the persistent storage on node 404D. For example, assume the type of storage is SSD. The driver may decode the transaction encoded in the public space to determine a data structure suitable for an SSD 215. In an example, the data structure (e.g., log or replace) chosen by the controller 418D for the SSD 215 type storage may be a journal or log data structure. In example, the controller 418D may package one or more transactions (not shown in the figure) to generate a log of changes between the linked list of objects stored in the SSD 215. The controller 418D may store a log of changes between the linked list of objects in the transactions and objects in the persistent storage in a buffer 212 (shown in FIG. 2) before persisting the log of changes on the SSD. The log may as describe above with reference to FIG. 2 record changes from the objects previously stored in the object store. In an example, the log may record changes between prior logs or between a log and another transaction. The controller 418D may then persist the log to the persistent storage in an address range reserved for a chain of logs detailing changes.

In examples, the node 404E may have a persistent storage 210 of the type NVRAM 315. The controller 418E may store one or more transactions in a staging area 212 before determining the address where the updates to objects represented in the object store are stored in the NVRAM 315 type storage as discussed above with reference to FIG. 3. The controller 418E may then store the linked list of updates by replacing the updates already stored in the persistent storage 210 with the new updates.

In an example, the system 100 may include a mixture of persistent storage on different nodes. In another example, the system 100 may include a mixture of persistent storage on the same node. In an example, the system 100 described above may maintain consistency between the nodes storing the data. For example, the order of persisting transactions may be important. The system 100 may allow more than one node to store the I/O operation. The ACID properties maintained by the system 100 allows two nodes storing data independent of each other to be consistent with one another.

Figure 5:
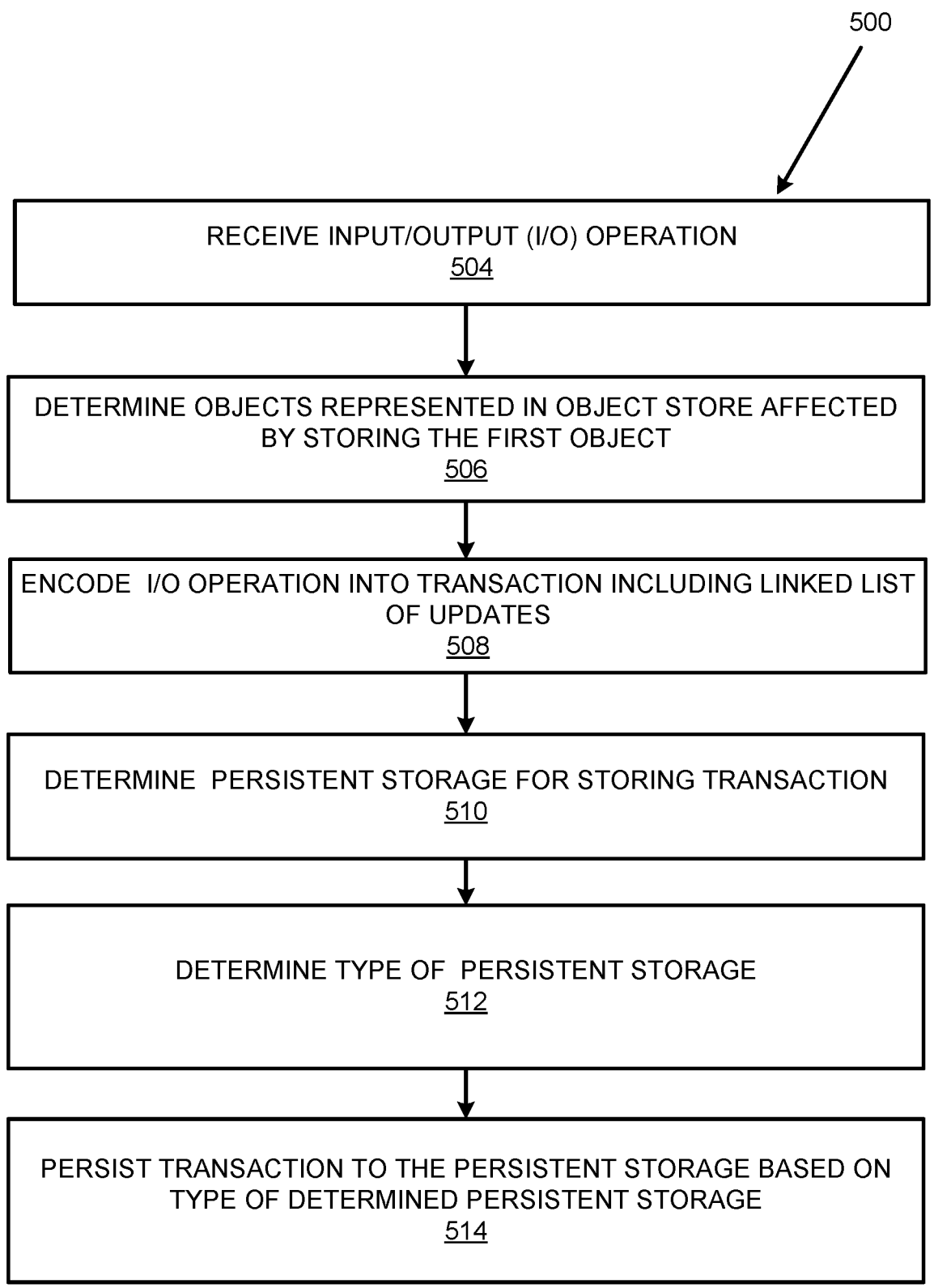
FIG. 5 illustrates a method, according to an example for transcoding an I/O operation into a transaction including a linked list of objects and persisting the transaction according to a type of persistent storage that is available for storing the transaction.

FIG. 5 illustrates a method 500 according to an example of persisting an I/O operation by transcoding the I/O operation into a transaction including a linked list of changes affected by storing the first object in persistent storage and changing the DAG to accommodate the first object in the object store. The method 500 may then store the transaction according to a data structure determined based on the type of the persistent storage. The method 500 may be performed by the system 100 shown in FIG. 1 or the system of nodes shown in FIG. 4. The method 500 may be performed by the processor 102 executing the machine-readable instructions stored on a non-transitory computer-readable medium.

At 504, the system 100 may receive an I/O operation. The I/O operation may store or modify the first object represented in the object store. For example, the system 100 may receive the I/O operation from a virtual machine layer above the object store that affects the first object represented in the object store. The object store may be a virtual layer that manages objects stored in persistent storage 210 located on a local node as shown above with reference to FIG. 4. The I/O operation may save the first object in the persistent storage 210. In examples, the first object may be a new object, a modification of an existing object or may indicate an existing object being deleted. For example, deleting an existing object may indicate dereferencing the first object in the object record of the first object. For example, if the first object is already present in the persistent storage 210, the system 100 may increase the reference count of the object in its object record instead of storing the object. If the I/O operation deletes the first object, the system 100 may decrement the reference count of the first object by one. In an example, thus saving the first object may also indicate deleting the first object by decrementing the first object's reference count. If the reference count of the first object is zero after decrementing the object may no longer be stored in the persistent storage and may be garbage collected and deleted by the system 100. The system 100 may thus store the first object received in the I/O operation using the volume manager in persistent storage. The volume manager may return the address where the object is stored.

At 506, the system may determine a linked list of updates (i.e., to objects represented in the object store affected by the I/O operation (i.e., storing the first object). For example, storing the first object may change the object record associated with the first object. The object record may be stored in an object index and thus changing the object record associated with the first object may change the object index. In another example, the I/O operation from the virtual machine may store the first object, that was already represented in the object store. The system 100 may determine a reference count update to the object record for the first object. In another example, the objects in the linked list of updates may point to changes in the hierarchical distance of the each of the object from a root object and an offset of the affected object at the hierarchical level. In an example, the offset may be the offset from a starting object at the hierarchical distance to the affected object.

At 508, the system 100 may transcode the I/O operation into a transaction that includes the linked list of updates to the affected objects represented in the object store. In an example, transcode may mean determining the changes to the DAG as a result of storing the first object and encapsulating them in a transaction 214. For example, the system 100 may determine the changes to the object record, the object index, intent logs and the like as a result of storing the first object and encapsulate the updates to these objects as a linked list of updates. The system 100 may determine changes at a byte level for the determined objects as a result of storing the first object. The system 100 may determine transactions such that the transactions maintain the ACID properties of the object store and maintain consistency of the objects represented in the object store and the corresponding transactions stored in the persistent store for the I/O operation as described above with reference to FIG. 1. The system 100 may also store an immutable record in the object record of the first object to indicate the order of transactions may be important. The system 100 may persist the immutable record to the persistent storage with a higher priority than persisting transactions to maintain consistency between the DAG in the object storage and the transactions in the persistent storage.

At 510, the system 100 may determine a persistent storage for storing the transaction. In an example, the system 100 may determine the available persistent storage. In an example, the persistent storage available may depend on the available space on a persistent storage, the current utilization of persistent storage for other operations and the like.

At 512, the system may determine a type of the persistent storage. In an example, the system 100 may include different types of persistent storage such as Triple Level Cell (TLC) flash, Multi-Level Cell (MLC) flash, Single Level Cell (SLC) flash, pseudo-Single Level Cell (pSLC) flash, memristor, SSD, Non-volatile memory such as NVRAM, and the like. In an example, the system 100 may retrieve the information from the firmware of the persistent storage. The system 100 may use different data structures for different persistent storage types. For example, assume the persistent storage is an SSD, the system 100 may use a journal data structure or log data structure and roll in one or more transactions into a journal log and store the journal log with the differences between the current data stored in the persistent storage and the current data in the object store on the SSD 215.

At 514, the system 100 may persist the transaction to the persistent storage according to the type of persistent storage. In examples, persisting the transaction may mean storing the transaction or parts of the transaction at a physical location on a persistent storage. In other examples, committing the transaction to the persistent storage may mean storing the updates in the linked list of updates on the persistent storage.

At 514, the system 100 may persist the transaction to the persistent storage based on the type of persistent storage. For example, the system 100 may bundle multiple transactions for storage on SSD and use a Journal log or log data structure as described above with reference to FIG. 2. Bundling of multiple transactions on SSDs may reduce the write amplification. For example, the system 100 may fit multiple transactions that fit within 4 KiB before committing or persisting the transactions to the SSD. In another example, the system 100 may directly commit the transactions for storage on NVRAM 315. In another example, for the NVRAM 315 the system 100 may use a temporary staging area (e.g., buffer 212 internal to the NVRAM) for the transaction before updating a previously stored object in the NVRAM 315 with the updates for that object in the linked list of objects as described above with reference to FIG. 3.

Figure 6:
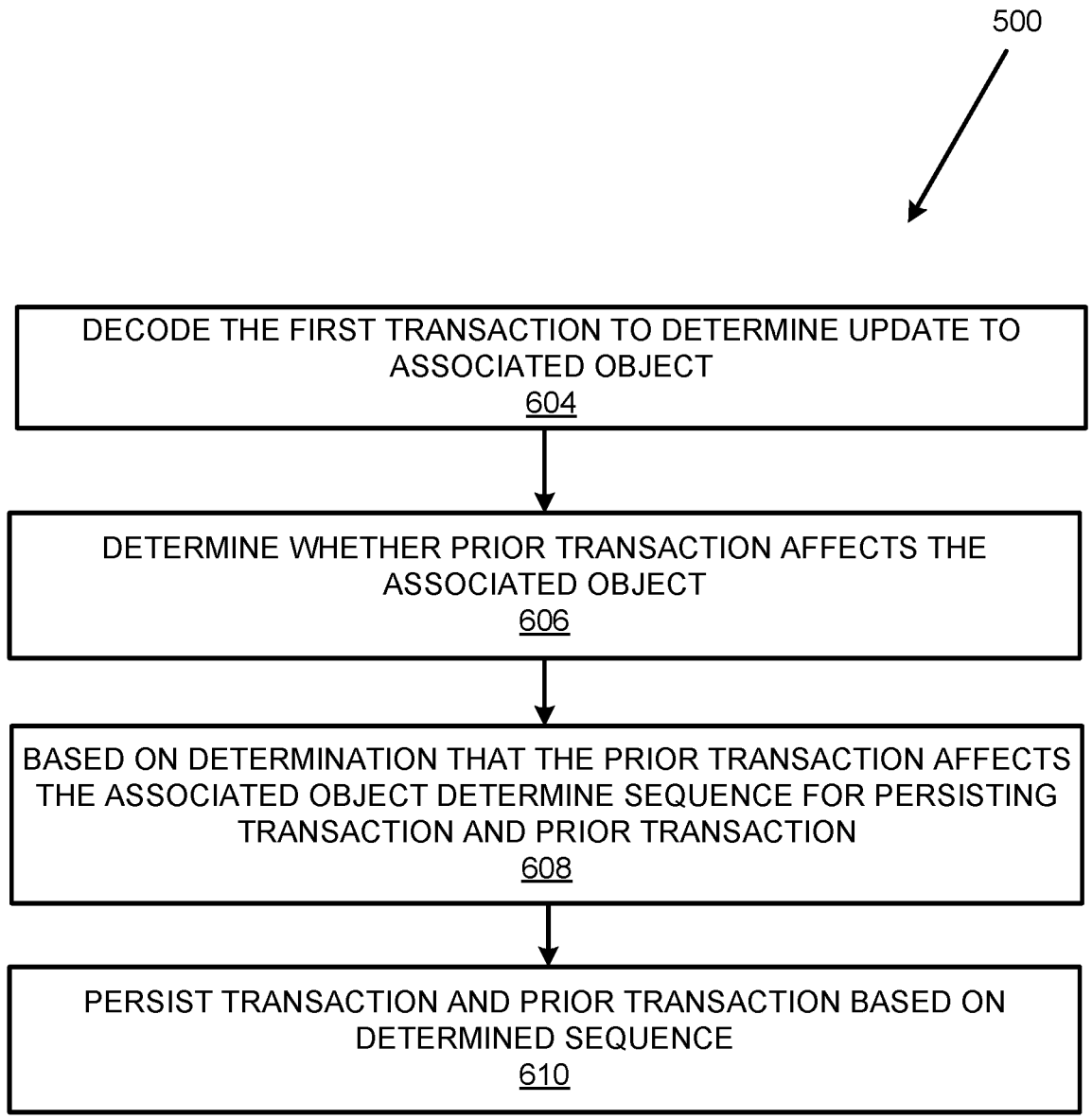
FIG. 6 illustrates a method, according to an example for determining a transaction sequence.

FIG. 6 illustrates a method 600 according to an example for determining transaction sequence. The method 600 may be performed by the system 100 shown in FIG. 1 or the system of nodes shown in FIG. 4. The method 600 may be performed by the processor 102 executing the machine-readable instructions stored on a non-transitory computer-readable medium.

At 604, the system 100 may decode the transaction to determine from the linked list of updates an update to an associated object represented in the object store. For example, the private function provided by device drivers as described above with reference to FIG. 1 may determine an update to an associated object represented in the object store. For example, the system 100 may determine an update to an object record associated with the first object.

At 606, the system 100 may determine whether a prior transaction affects the associated object. With reference to the example described in the previous instruction at 604, the system 100 may determine whether the prior transaction affects the object record of the first object. For example, the system 100 may decode the first transaction to determine whether the object record of the first object is changed by the prior transaction.

In an example, the system 100 may use an immutable entry stored in the object index of the first object to determine whether a prior transaction affects an associated object represented in the object store.

At 608, the system 100 may determine a sequence for persisting the transaction and the prior transaction based on a determination that the prior transaction affects the associated object. In an example, the system 100 may determine based on an immutable entry to determine the prior transaction has to be persisted first.

At 610, the system 100 may persist the transaction and the prior transaction based on the determined sequence. For example, the system 100 may persist the prior transaction first and then the transaction based on the determined sequence. In another example, the system 100 may delay persisting the transaction when the immutable entry is present. The system 100 may then persist the transaction when the immutable entry is no longer present.

In another example, the system 100 may persist the transaction and the prior transaction concurrently when there is no immutable entry.

Figure 7:
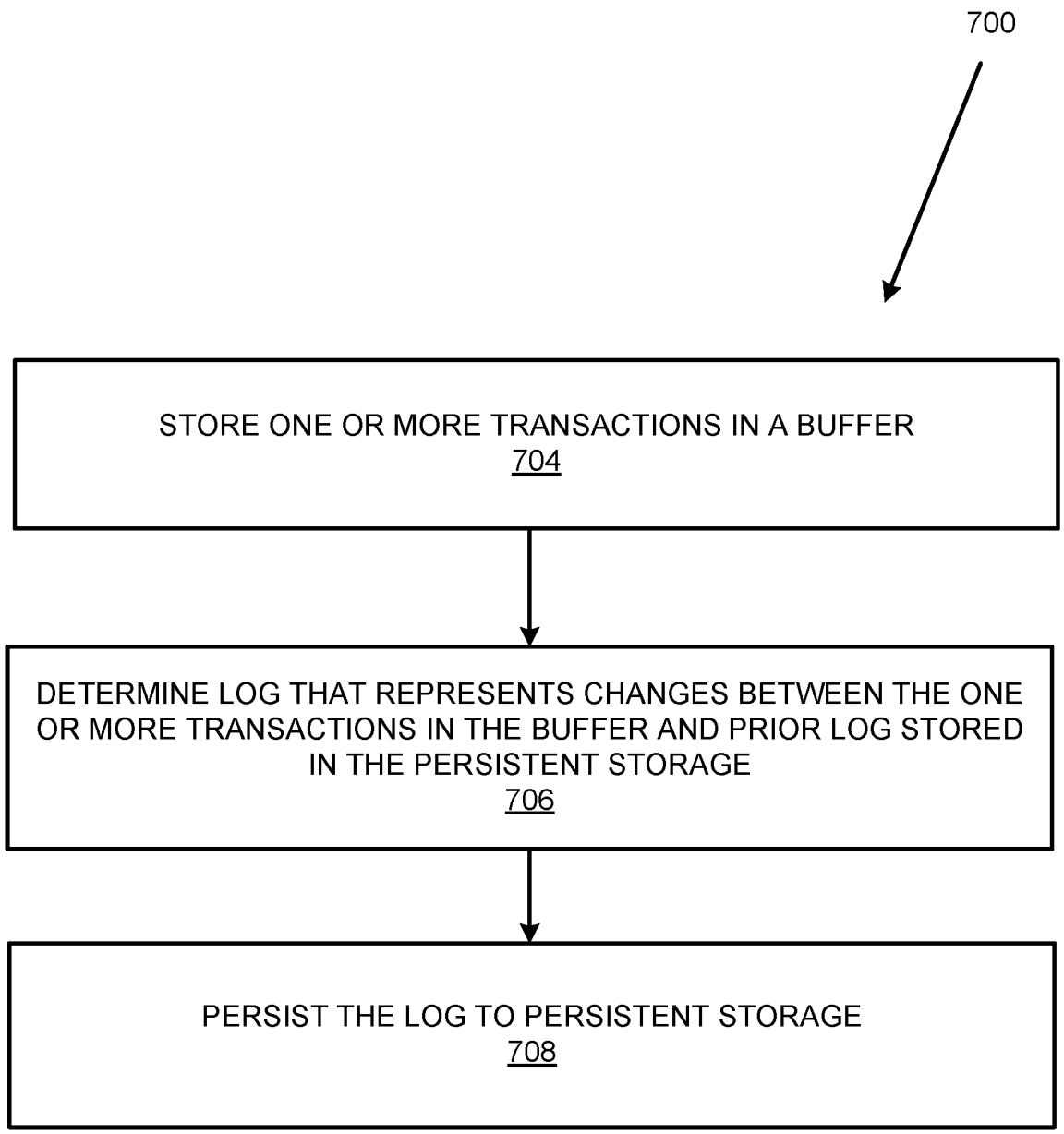
FIG. 7 illustrates a method, according to an example for storing a transaction using a private function.

FIG. 7 illustrates a method 700 according to an example for storing a transaction using a private function. The method 700 may be performed by the system 100 shown in FIG. 1 or the system of nodes shown in FIG. 4. The method 700 may be performed by the processor 102 executing the machine-readable instructions stored on a non-transitory computer-readable medium.

At 704, the system 100 may store one or more transactions in a buffer 212 as described above with reference to FIG. 2.

At 706, the system 100 may determine a log with changes between the one or more transaction in the buffer and a prior log stored in the persistent storage. For example, as described above with reference to FIG. 2 the system 100 may determine a log that represents changes between the last of the prior logs stored in the persistent storage shown as 0, 1, 2, - - - n and the one or more transactions in the buffer.

At 708, the system 100 may persist the log to the persistent storage. For example, as described above with reference to FIG. 2, the system 100 may store the log in a contiguous memory space in the case of an SSD 215. Thus, the system 100 may use a private function optimized to the type of the persistent storage 210 (e.g., SSD 215)

In another example, the system 100 may store the transaction in a temporary staging area (e.g. buffer 212 internal to the NVRAM 315) as shown with reference to FIG. 3. In an example, the temporary staging area may be a located on the persistent storage. For example, the temporary staging area may be the NVRAM 315, which may be bit addressable. The system 100 may then determine changes between the linked list of updates and prior updates stored on the persistent storage. For example, the system 100 may determine the changes between an update in the linked list of updates and the updates stored in the regions 302, 304 and 306. The system 100 may then persist the determined change directly to the persistent storage in the corresponding regions. The system 100 may thus use a private driver 422 optimized to the NVRAM 315.

While embodiments of the present disclosure have been described with reference to examples, those skilled in the art will be able to make various modifications to the described embodiments without departing from the scope of the claimed embodiments.

What is claimed is:

1. A non-transitory computer-readable medium comprising instructions executable by a processor to:
receive an input/output (I/O) operation in an object store, the I/O operation including storing a first object;
determine objects represented in the object store that are affected by the storage of the first object;
transcode the I/O operation into a transaction utilizing a public function, the transaction including a linked list of updates to the determined objects resulting from the storing of the first object;
determine one or more persistent storage for storing the transaction;
determine a type of each persistent storage; and
persist the transaction to each persistent storage utilizing a private function for the persistent storage, the transaction being persisted to each persistence storage according to a data structure determined by the type of the persistent storage.

2. The non-transitory computer-readable medium of claim 1, wherein the instructions to persist the transaction comprise:
decode the transaction to determine from the linked list of updates an update to an associated object represented in the object store;
determine whether a prior transaction affects the associated object;
based on a determination that the prior transaction affects the associated object, determine a sequence for persisting the transaction and the prior transaction; and
persist the transaction and the prior transaction based on the determined sequence.

3. The non-transitory computer-readable medium of claim 1, wherein the instructions to persist the transaction comprise:
decode the transaction to determine from the linked list of updates an update to an associated object represented in the object store;
determine whether a prior transaction affects the associated object in the linked list of updates; and
based on a determination that the prior transaction affects the associated object, delay persisting the transaction to the one or more persistent storage until the prior transaction is persisted.

4. The non-transitory computer-readable medium of claim 1, wherein the instructions to persist the transaction comprise:
store a log of containing the transaction and a prior transaction in a buffer; and
persist the log to the one or more persistent storage.

5. The non-transitory computer-readable medium of claim 4, wherein the buffer is distinct from the one or more persistent storage.

6. The non-transitory computer-readable medium of claim 1, wherein the instructions to persist the transaction comprise:
determine a log that represents changes between the transaction and a prior transaction stored in the one or more persistent storage;
store the log in a buffer; and
persist the log to the one or more persistent storage.

7. The non-transitory computer-readable medium of claim 1, wherein the instructions to persist the transaction comprise:
store the linked list of updates in a temporary staging area in the one or more persistent storage;
determine changes between the linked list of updates and a prior linked list of updates in the one or more persistent storage; and
persist the determined changes in the one or more persistent storage.

8. The non-transitory computer-readable medium of claim 1, wherein the transaction comprises:
an indivisible set of updates to the objects represented in the object store to maintain Atomicity, Consistency, Isolation, Durability (ACID) properties in the object store.

9. The non-transitory computer-readable medium of claim 1, comprising instructions executable by a processor to:
determine whether the transaction is called back before the transaction is persisted on the determined one or more persistent storage; and
in response to a determination that the transaction is called back before the transaction is persisted, rollback any updates to the one or more persistent storage.

10. The non-transitory computer-readable medium of claim 1, wherein the public function is applicable to a plurality of hardware platforms for persistent storage.

11. The non-transitory computer-readable medium of claim 1, wherein the one or more persistent storage include a first persistent storage of a first type and a second persistent storage of a second type, and wherein a first private function is utilized for the first persistent storage and a second private function is utilized for the second persistent storage.

12. A method executed by a processor comprising:
receiving an I/O operation in an object store, the I/O operation including storing a first object;
determining a linked list of updates to objects represented in the object store that are affected by the storage of the first object;
transcoding the I/O operation into a transaction utilizing a public function, the transaction including the linked list of updates;
determining one or more persistent storage for storing the transaction;
determining a type of each persistent storage; and
persisting the linked list of updates in the transaction to each determined persistent storage utilizing a private function for the persistent storage, the transaction being persisted to each persistence storage according to the type of the persistent storage.

13. The method of claim 12, comprising:
decoding the transaction to determine from the linked list of updates an update to an associated object represented in the object store;
determining whether a prior transaction affects the associated object;
based on a determination that the prior transaction affects the associated object, determining a sequence for persisting the transaction and the prior transaction; and
persisting the transaction and the prior transaction based on the determined sequence.

14. The method of claim 12, comprising:
decoding the transaction to determine from the linked list of updates an update to an associated object represented in the object store;
determining whether a prior transaction affects the associated object; and based on a determination that the prior transaction affects the associated object, delay persisting the transaction to the one or more persistent storage until the prior transaction is persisted.

15. The method of claim 12 comprising:
store one or more transactions in a buffer;
determine a log that represents changes between the one or more transactions in the buffer and a prior log stored in the one or more persistent storage; and
persist the log to the one or more persistent storage.

16. The method of claim 12 comprising:
storing the linked list of updates in a temporary staging area;
determining changes between the linked list of updates and updates in the one or more persistent storage; and
persisting the determined changes in the one or more persistent storage.

17. The method of claim 12 comprising:
decode the transaction to determine from the linked list of updates an update to an associated object represented in the object store;
determine whether a prior transaction affects the associated object;
based on a determination that the prior transaction affects the associated object in the linked list of updates, determine a sequence for persisting the transaction and the prior transaction; and
persist the transaction and the prior transaction based on the determined sequence.

18. A system comprising:
a plurality of network nodes, wherein each node comprises:
a processor;
an object store to store updates; and
a memory to store machine-readable instructions, wherein the processor is to execute the machine-readable instructions to:
receive an I/O operation, the I/O operation including storing a first object in the object store;
determine a linked list of updates to objects in the object store that are affected by the storage of the first object;
transcode the I/O operation into a transaction utilizing a public function, the transaction including the linked list of updates;
determine one or more persistent storage for storing the transaction;
determine a type of each persistent storage; and
persist the transaction to each persistent storage utilizing a private function for the persistent storage, the transaction being persisted to each persistence storage according to a data structure determined by the type of the persistent storage.

19. The system of claim 18, wherein the instructions to persist the transaction comprise:
decode the transaction to determine from the linked list of updates an update to an associated object represented in the object store;
determine whether a prior transaction affects the associated object; and
based on a determination that the prior transaction affects the object in the linked list of updates, delay persisting the transaction to the one or more persistent storage until the prior transaction is persisted.

20. The system of claim 18, wherein the instructions to persist the transaction comprise:
decode the transaction to determine from the linked list of updates an update to an associated object represented in the object store;
determine whether a prior transaction affects the associated object in the linked list of updates;
based on a determination that the prior transaction affects the associated object, determine a sequence for persisting the transaction and the prior transaction; and
persist the transaction and the prior transaction based on the determined sequence.

21. The system of claim 18, wherein the instructions to persist the transaction comprise:
store one or more transactions in a buffer;
determine a log that represents changes between the one or more transactions in the buffer and a prior log stored in the one or more persistent storage; and
persist the log to the one or more persistent storage.

22. The system of claim 18, wherein the instructions to persist the transaction comprise:
storing the linked list of updates in a temporary staging area;
determining changes between the linked list of updates and prior updates stored on the one or more persistent storage; and
persisting the determined changes in the one or more persistent storage.

* * * * *